US010620875B2

(12) United States Patent
Vasudevan

(10) Patent No.: US 10,620,875 B2
(45) Date of Patent: Apr. 14, 2020

(54) CLOUD STORAGE SYSTEM

(71) Applicant: Hewlett Packard Enterprise Development LP, Houston, TX (US)

(72) Inventor: Suresh Vasudevan, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 169 days.

(21) Appl. No.: 15/681,276

(22) Filed: Aug. 18, 2017

(65) Prior Publication Data

US 2018/0081562 A1    Mar. 22, 2018

Related U.S. Application Data

(60) Provisional application No. 62/396,050, filed on Sep. 16, 2016.

(51) Int. Cl.
*G06F 3/06* (2006.01)
*G06F 12/0891* (2016.01)
(Continued)

(52) U.S. Cl.
CPC ............ *G06F 3/0656* (2013.01); *G06F 3/061* (2013.01); *G06F 3/0608* (2013.01); *G06F 3/0625* (2013.01); *G06F 3/0685* (2013.01); *G06F 12/0875* (2013.01); *G06F 12/0891* (2013.01); *G06F 12/1045* (2013.01);
(Continued)

(58) Field of Classification Search
CPC ...... G06F 3/0608; G06F 3/061; G06F 3/0625; G06F 3/0656; G06F 3/0685; G06F 9/45533; G06F 9/45558; G06F 12/0811; G06F 12/0875; G06F 12/0891; G06F 12/1045;
(Continued)

(56) References Cited

U.S. PATENT DOCUMENTS 9,483,187 B2    11/2016  Karaje et al.
2005/0132212 A1*    6/2005  Haswell .............. G06F 3/0619
                                                                                713/193
(Continued)

*Primary Examiner* — Gary J Portka
(74) *Attorney, Agent, or Firm* — Trop, Pruner & Hu, P.C.

(57) ABSTRACT

Methods, systems, and computer readable media for execution by a cloud storage system are provided. One example method is for storage processing on a cloud system. The method includes executing a storage application on a compute node of the cloud system, and the storage application is configured to process write commands and read commands to and from storage of the cloud system. The write commands and the read commands are from an application. The method includes processing, by the storage application, a write command from the application. The processing includes writing data blocks to memory cache provided by the compute node for the storage application; writing data blocks written to memory cache to a write cache of a block storage that is part of the storage of the cloud system; and writing select data blocks written to memory cache to a read cache of block storage that is part of storage of the cloud system. The method further includes coalescing, by the storage application, the data blocks to produce data segments and writing, by the storage application, the data segments to object storage that is part of storage of the cloud system. The methods also include management of a read path via the storage application.

20 Claims, 10 Drawing Sheets

(51) Int. Cl.
*G06F 12/0875* (2016.01)
*G06F 12/1045* (2016.01)
*G06F 9/455* (2018.01)

(52) U.S. Cl.
CPC ...... *G06F 9/45533* (2013.01); *G06F 9/45558* (2013.01); *G06F 2009/45562* (2013.01); *G06F 2212/452* (2013.01); *G06F 2212/60* (2013.01); *Y02D 10/154* (2018.01)

(58) Field of Classification Search
CPC ........... G06F 2212/452; G06F 2212/60; Y02D 10/154
USPC ................... 709/214; 711/120, 122, 125, 130
See application file for complete search history.

(56) References Cited

U.S. PATENT DOCUMENTS

| | | |
|---|---|---|
| 2009/0240911 A1 | 9/2009 | Yamada |
| 2009/0313426 A1 | 12/2009 | See |
| 2011/0231598 A1 | 9/2011 | Hatsuda |
| 2012/0017034 A1 | 1/2012 | Maheshwari |
| 2014/0067994 A1* | 3/2014 | Puttaswamy Naga ...................... H04L 41/0896 709/217 |
| 2014/0223094 A1 | 8/2014 | Baderdinni |
| 2015/0134915 A1 | 5/2015 | de la Iglesia |
| 2015/0193342 A1* | 7/2015 | Ohara ................. G06F 12/0873 711/120 |
| 2016/0019146 A1* | 1/2016 | Vekiarides .......... G06F 12/0811 711/122 |
| 2018/0081591 A1* | 3/2018 | Maheshwari ......... G06F 3/0656 |

* cited by examiner

CLOUD STORAGE SYSTEM

CLAIM OF PRIORITY

This application claims priority from U.S. Provisional Application No. 62/396,050, filed on Sep. 16, 2016, and entitled "Cloud Storage System," which is hereby incorporated by reference.

FIELD OF THE EMBODIMENTS

The present disclosure provides systems and methods for processing cloud storage operations, and in particular implementations, storage operations are executed on a compute node of a cloud system, which provides for management of data writes and reads to one or more types of storage provided by the cloud system.

BACKGROUND

Storage arrays are used to store data. Commonly, storage arrays have at least one controller for managing access to storage media of the storage array. The storage media of a storage array may include one or more hard disk drives (HDDs) and/or one or more solid state drives (SSDs). Storage arrays are typically configured with connections to servers via one or more switches to enable efficient and reliable access between the servers and storage arrays.

Recently, there have been substantial improvements in cloud infrastructure. Cloud infrastructure is typically constructed by cloud service providers. Cloud service providers typically provide services for remote users, which include access to customized computing power to run applications and serve data to numerous remote users. The cloud infrastructure therefore includes server systems, which are typically virtualized.

In this manner, a cloud service provider can provide private (and/or public) and separate access to computing resources (i.e., virtual machines) to numerous customers. The cloud infrastructure is also configured with storage (e.g., which may use many networked storage arrays). This storage is also provided to customers, so that their custom applications can store and access data. Storage is typically installed in datacenters, along with servers and networking equipment. Because the various customers of the cloud service provider have different needs for storage, the cloud service provider will commonly offer different types of storage. These different types of storage may have different performance levels and pricing. Thus, for some customers of the cloud service provider, faster storage access is important, e.g., such as for cloud database processing and serving of such data. For other customers, storage capacity is more important, e.g., for cloud file sharing. As such, for said cloud file sharing, storage access speeds may not be as important. For these reasons, cloud service providers offer various times of storage solutions, each with different performance characteristics and price points for data capacity, data reads, data writes, etc.

Unfortunately, customers that are provisioned compute resources and storage are provisioned based on an initial setup. Once the customer's applications are installed and storage is selected and assigned, the customer's applications are held to the fixed storage configuration. That is, if the customer is assigned a type of storage that is fast for random input/output (I/O), which might be the case for database-type programs, that storage type must also service operations associated with other application transactions, which may write data in larger linear chunks. As a result, customers that may have optimized their provisioned compute resources and storage initially, e.g., at set up or periodically, may suffer inefficiencies in storage utilization. Inefficient storage utilization may include deterioration in data access performance, delays in process, as well as inefficient use of storage on a per-transaction cost of using the selected storage types offered by the cloud service provider.

It is in this context that embodiments claimed herein arise.

SUMMARY

Methods, systems, storage systems, and computer readable media are provided for provisioning storage resources on a cloud infrastructure. In one embodiment, a method is executed on a compute node provisioned by a cloud service provider, which functions to execute a storage application. The storage application is configured as a layer that handles storage access needs of an application that is executed on another compute node (e.g., virtual machine) of the cloud service provider. The storage application is configured to handle write commands and read commands of the application and then direct the operations to two or more different types of storage provisioned by the cloud storage provider. The storage application, in one embodiment, uses different storage resources provisioned and made accessible by the cloud service provider. The storage application, when provisioned in a cloud infrastructure, operates as a cloud storage system.

The storage application, when operating on a compute node of the cloud infrastructure, is acting as a layer or interface that makes more efficient use of the different types of storage provided by the cloud service provider. In some embodiments, the storage application further executes storage management functions using memory provided to the compute node on which the storage application is running. These management functions include, for example, data reduction functions (e.g., deduplication, compression, garbage collection (GC), etc.), selection of a different type of storage to function as write cache and read cache (e.g., in block storage), selection of a different type of storage to function as longer term storage (e.g., in object storage), functions to optimize writing to longer term storage, e.g., such as coalescing functions to sequentially arrange data to be written to object storage.

These example functions are provided by the storage application, which operates to make more efficient use of storage types provided by cloud service providers. This efficient use is useful in reducing processing power, reducing delays, and reducing inefficient cost spends when incorrectly formatted data is written to certain types of storage. As a result, customers of the cloud service provider can make more efficient use of storage, e.g., by way of utilizing the storage application as an interface or layer, which executes in the cloud. From the standpoint of the customer of the cloud service provider, the applications still run on compute nodes of the cloud service provider and they still use storage of the cloud service provider, albeit, the utilization of storage by said customers will be more efficient. This translates into higher performance for the customer and in some cases, reduced storage utilization costs.

In one embodiment, a method for storage processing on a cloud system is provided. The method includes executing a storage application on a compute node of the cloud system, and the storage application is configured to process write commands and read commands to and from storage of the cloud system. The write commands and the read commands are from an application executed on the cloud system and configured to use the storage application for accessing said storage. The method includes processing, by the storage application, a write command from the application. The processing includes writing data blocks to memory cache provided by the compute node for the storage application; writing data blocks written to memory cache to a write cache of a block storage that is part of the storage of the cloud system; and writing select data blocks written to memory cache to a read cache of block storage that is part of storage of the cloud system. The method further includes coalescing, by the storage application, the data blocks to produce data segments and writing, by the storage application, the data segments to object storage that is part of storage of the cloud system.

In some embodiments, the method further includes processing, by the storage application, the data blocks written to memory cache for data reduction to produce compressed data blocks and then proceeding to said coalescing.

In some embodiments, writing of the select data blocks to the read cache of block storage occurs before performing a data reduction to produce compressed data blocks.

In some embodiments, writing of the select data blocks to the read cache of block storage occurs after performing a data reduction to produce compressed data blocks.

In some embodiments, the method further includes processing, by the storage application, a read command from the application. The processing includes, reading data blocks from the memory cache; and for data blocks not found in memory cache, reading from the read cache of block storage; and for data blocks not found in read cache of block storage, reading from said object storage.

In some embodiments, the method further includes writing, by the storage application, data blocks read from object storage back to the read cache of block storage.

In some embodiments, the method further includes the select data blocks written to the read cache of block storage are identified as cache-worthy data blocks.

In some embodiments, the method further includes each of the write cache and the read cache as defined by one or more volumes that are logically associated to said block storage.

In some embodiments, the method further includes said volumes of said write cache having a performance level that is greater than said volumes of said read cache.

In some embodiments, the method further includes the coalescing of said compressed data blocks is further configured to arrange said compressed data blocks in sequential order to produce said data segments.

In some embodiments, the method further includes said data segments having a size of at least one megabyte or larger, the size of said data segments acting to optimize writing to said object storage.

In some embodiments, the method further includes data blocks written to each of said write cache and said read cache of said block storage represent random input/output (I/O) storage operations.

In some embodiments, the method further includes the processing by the storage application utilizing said block storage and said object storage in a hybrid-cloud storage configuration that is optimized for efficient acknowledgments of write commands via said memory cache and optimized for efficient writing to said object storage in data segments that are sequentially ordered by said storage application.

In some embodiments, the method further includes said storage application executes a storage operating system logic that directs writing and reading to and from said storage that includes said block storage and said object storage.

In some embodiments, the method further includes a plurality of applications are configured to access the storage application as an interface to access said storage of said cloud system.

In some embodiments, the method further includes the storage application is a storage processing layer between the application and the storage of the cloud system, the storage application configured to direct processing of the data blocks exchanged between the application and the storage, which include at least said block storage and said object storage, the cloud system being provisioned by an online cloud service provider.

In one embodiment, a method for storage processing on a cloud system is provided. The method includes executing a storage application on a compute node of the cloud system. The storage application is configured to process write commands and read commands to and from storage of the cloud system, and the write commands and the read commands being from an application executed on the cloud system and configured to use the storage application for accessing said storage. The method further includes processing, by the storage application, a read command from the application, the processing includes, reading data blocks from a memory cache provided by the compute node for the storage application, and if the data blocks for the read command are not present in the memory cache, reading data blocks from a read cache of a block storage that is part of the storage of the cloud system, and if the data blocks for the read command are not present in the read cache of the block storage, reading data blocks from an object storage that is part of the storage of the cloud system. The method also includes processing, by the storage application, a write-back of data blocks read from the object storage to the read cache of the block storage.

In some embodiments, data blocks read from block storage are written as random input/output (I/O), and data blocks read from object storage are written in coalesced data segments.

In some embodiments, each of the write cache and the read cache are defined by one or more volumes that are logically part of said block storage.

In some embodiments, volumes of said write cache have a performance level that is greater than said volumes of said read cache.

In some embodiments, said coalesced data segments have a size of at least one megabyte or larger, such that the size of said coalesced data segments act to optimize writing to said object storage.

In some embodiments, the processing by the storage application utilizes said block storage and said object storage in a hybrid-cloud storage configuration that is optimized for efficient acknowledgments of write commands via said memory cache and said write cache and optimized for efficient writing to said object storage in data segments that are sequentially ordered by said storage application.

In some embodiments, the storage application is a storage processing layer between the application and the storage of the cloud system, the storage application configured to direct processing of the data blocks exchanged between the application and the storage, which include at least said block storage and said object storage, the cloud system being an online cloud service provider.

In some embodiments, select ones of the data blocks written to the read cache of block storage are identified as cache-worthy to expedite reading of data blocks in response to the read command.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements.

DETAILED DESCRIPTION

Figure 1:
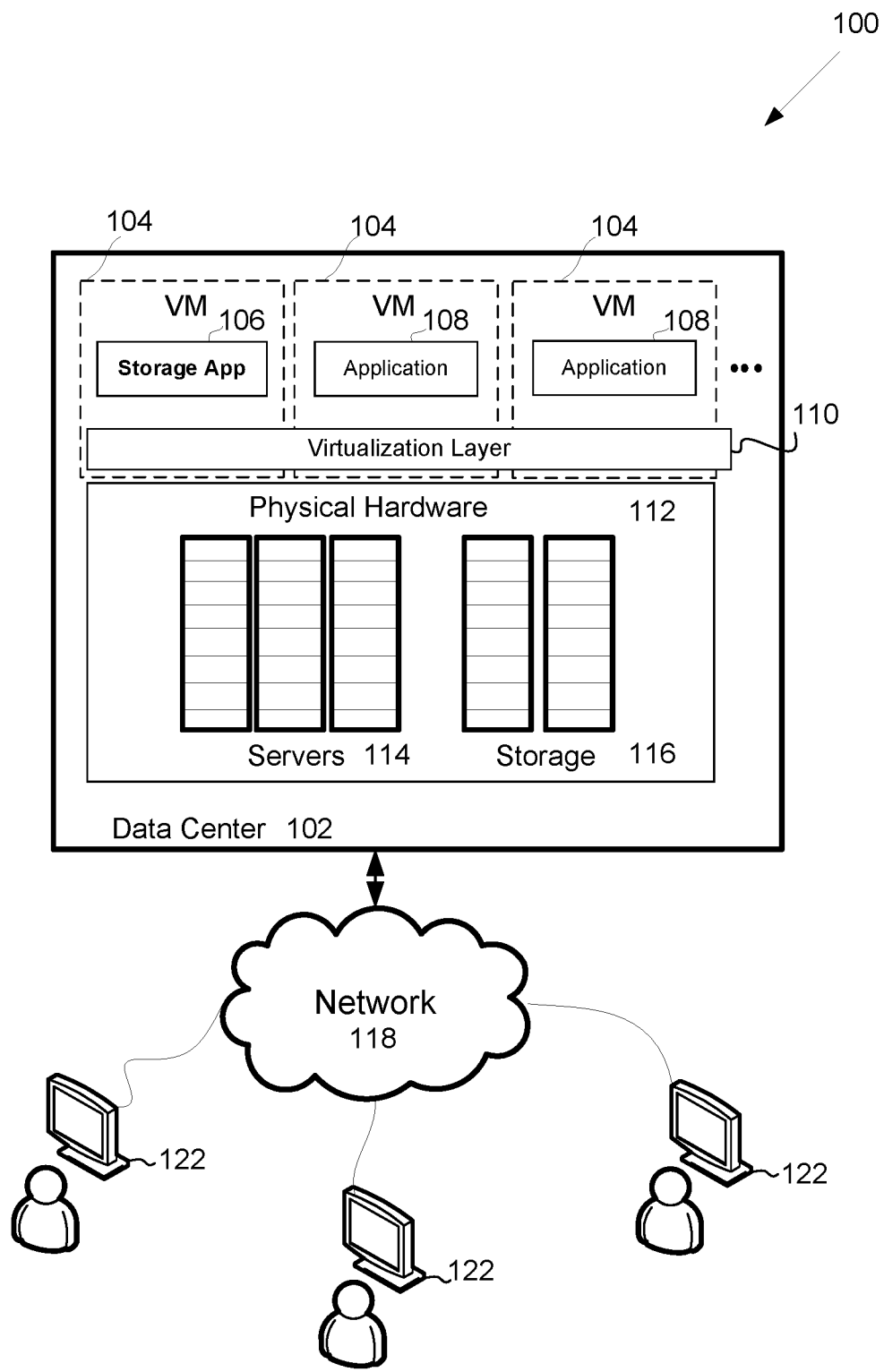
FIG. 1 illustrates an example cloud infrastructure, which provides processing and data services to clients, in accordance with one embodiment.

The following embodiments describe methods, systems, and computer programs for processing storage accesses, e.g., writes, reads and transfers of other commands to and from storage resources of a cloud infrastructure. The cloud infrastructure, in one embodiment, is provisioned by a cloud service provider. The cloud service provider operates one or more datacenters, and said datacenters are used to service customers that install and operate applications. The applications, running on the cloud infrastructure, are typically referred to as cloud applications or cloud-based applications. These cloud applications may require different amounts of storage and/or different types of storage, depending upon the function of the applications, demands, client loads, stress requirements, and/or storage capacity. In one configuration, a method is executed on a compute node provisioned by the cloud service provider, which functions to execute a storage application. The storage application is configured as a layer that handles storage access needs of an application that is executed on another compute node (e.g., virtual machine) of the cloud service provider. In alternate configurations, the storage application and the application(s) may execute on the same compute node. The storage application is configured to handle write commands and read commands of the application and then direct the operations to two or more different types of storage provisioned by the cloud storage provider. The storage application, in one embodiment, is configured to operate similar to the way a storage operating system operates on physical storage array, but instead, uses different storage resources provisioned by the cloud service provider which could be much more expansive and numerous than a physical storage array. The storage application, when provisioned in a cloud infrastructure, operates as a cloud storage system.

In some embodiments, the storage application further executes storage management functions using memory provided to the compute node on which the storage application is running. These management functions include, for example, data reduction functions (e.g., deduplication, compression, garbage collection, etc.), selection of a different type of storage to function as write cache and read cache (e.g., in block storage), selection of a different type of storage to function as longer term storage (e.g., object storage), functions to optimize writing to longer term storage, e.g., such as coalescing functions to sequentially arrange data to be written to object storage.

These example functions are provided by the storage application, which operates to make more efficient use of storage types provided by cloud service providers. This efficient operation is useful in reducing processing power, reducing delays, and reducing inefficient cost spends when incorrectly formatted data is written to certain types of storage. As a result, customers of the cloud service provider can make more efficient use of storage, e.g., by way of utilizing the storage application as an interface or layer, which executes in the cloud. From the standpoint of the customer of the cloud service provider, the applications still run on compute nodes of the cloud service provider and they still use storage of the cloud service provider, albeit, the utilization of storage by said customers will be more efficient. This translates into higher performance for the customer and in some cases, reduced storage utilization costs.

In some configurations, the storage application may be executed on multiple compute nodes, where each compute node services one application. In other configurations, the storage application may be executed on one compute node and from that compute node, the storage access functions of two or more applications may be services. In still other embodiments, each application may be provided with an instance of the storage application, which can be configured and adjusted to optimize the writing and reading of data to one or more of the storage resources of the cloud service provider. In further configurations, the storage application is provided with remote access to a management interface, which allows for customized provisioning of the storage application functions. For example, the customized provisioning may enable adjustments from time to time regarding the types of storage resources selected for particular applications. The adjustments may be for optimizing reads, the optimizations may be for optimizing writes, the optimizations may be to use new storage resources that may have been newly added to the cloud infrastructure by the cloud service provider.

In still other embodiments, the optimizations may be made programmatically, based on learned usage patterns of the application or based on learned metrics determined from other installations of the storage application. The learned metrics, in one embodiment, relate to metadata that describe the storage access operations, and not the data itself. Thus, some configurations, enable metadata analysis from multiple installations of the storage application, which can then be used to make dynamic changes to settings, recommend setting upgrades, recommend provisioning of different storage types, adjust compression settings, recommend adjustments to compression, adjust or recommend deduplication processing, adjust or recommend upgrades or downgrades in storage resources that may be provisioned, etc.

With this overview in mind, the following diagrams provide several example implementations of a storage application, provided to optimize the utilization of storage resources provided by a cloud storage provider.

FIG. 1 illustrates an example cloud infrastructure 100, which provides processing and data services to clients 122. The clients 122 typically connect to the data center 102 over a network 118, to access the services provided by applications 108 that may be executing on virtual machines 104 of the cloud infrastructure 100. As shown, the network provides access to data center 102, but it should be understood that cloud infrastructure 100 may include multiple data centers 102, and the network 108 can include the Internet, which provides access to applications 108, which may be processed on one or more virtual machines 104. The virtual machines 104 are rendered using a virtualization layer 110. As shown, the application 108, associate to a virtual machine 104, can operate as if it were a standalone machine, but instead utilizes physical hardware 112. The physical hardware 112 includes servers 114 and storage 116. The physical hardware 112 is shared by the virtual machines 104, and to the application 108, the servers 114 and storage 116 provisioned to that virtual machine work as if the virtual machine were a physical provisioned machine. In this manner, the cloud infrastructure 100 is able to provision multiple virtual machines 104 and provide access to physical hardware 112 that is shared using virtualization layer 110.

In accordance with one embodiment, a storage application 106 is also configured to be executed on a virtual machine 104. Execution of the storage application 106 on the virtual machine 104 is asked to provide a compute node within the cloud infrastructure 100. Generally speaking, a compute node is one where processing power is provided by a portion of the servers 114. In typical configurations, the cloud service provider will also allow customers to install their desired operating system within the compute node, such that there applications can run within the virtual machine 104. The storage application 106 running in one of the virtual machines 104 is configured to provide storage access services to one or more other applications 108. By way of example, storage application 106 executing on a compute node of the cloud infrastructure 100, can provide a layer interface between the storage access needs of the application 108 and the storage 116 that may be provisioned by the storage service provider to that application 108.

As used herein, the storage application 106 functions as a layer, since it operates to provide storage access to storage 116 and a customized format, that provides more efficient utilization of different types of storage 116 that may be provisioned by the cloud services provider. As mentioned above, the storage application 106 is configured to handle write operations and read operations in response to storage needs of the application 108. From the standpoint of application 108, the operations of storage application 106 are transparent, as the storage access is still provided to storage 116, albeit in a more efficient manner. The efficiency provided by the storage application 106 is that the layer provides for utilization of different types of storage 116 provided by the cloud infrastructure 100. Additionally, embodiments of the present invention enable processing by the storage application 106 to organize data that is to be written to the storage 116, such that more efficient utilization of the different types of storage 116 are achievable.

As will be described below, types of storage 116 that are commonly provisioned by cloud storage providers include storage that is optimized for block writing, and storage that is optimized for object writing. Block writing is typically associated with writing of non-sequential data, e.g. data blocks, whereas object writing is typically associated with writing of larger chunks of data that may be sequentially ordered. In general, there are many companies that operate as cloud service providers. One such company is Amazon Web Services (AWS), which is managed as an entity of Amazon, Inc. AWS, for instance, provides options for block storage under a trade name of elastic block storage (EBS), and object storage under a trade name of simple storage services (S3). Other types of storage services offered by AWS include less active storage referred to under a trade name of Glacier. Storage provided by Glacier moves data slower, but is capable of supporting large amounts of data. In an AWS system, compute nodes are referred to under a trade name of elastic cloud compute (EC2). It should be understood that reference to AWS or any other commercial entity is only by way of example, and is not exclusive to any specific vendor, current configuration, or offered service. To the contrary, the embodiments described herein are believed equally applicable to any cloud service provider that may provision two or more types of storage solutions.

In one configuration, the storage application 106 is configured to optimize the selection data blocks to be written to block storage, and optimize processing of data before it is written to object storage. The optimized processing may include, for example, coalescing the data blocks such that data blocks are sequentially written in data segments.

Figure 2:
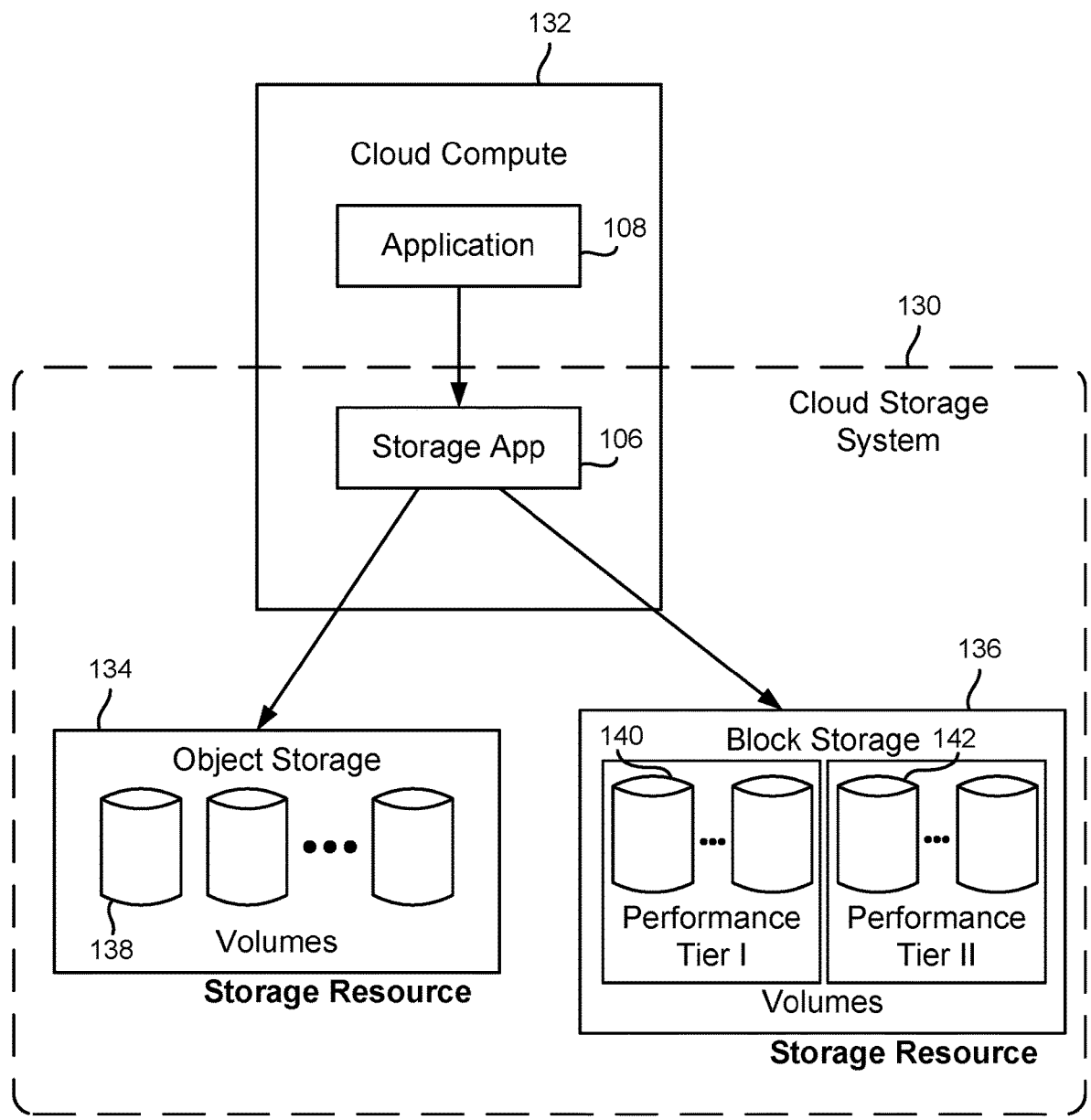
FIG. 2 illustrates an example of a cloud compute that may function to execute an application and storage application, in accordance with one embodiment of the present invention.

FIG. 2 illustrates an example of a cloud compute 132 that may function to execute an application 108 and storage application 106, in accordance with one embodiment of the present invention. In this example, the cloud compute 132 may be defined by one or more virtual machines 104, as described above. This illustration shows that application 108 will utilize storage application 106 as a layer or service for accessing storage resources of the storage 116 in the cloud infrastructure 100. Storage application 106 functions in coordination with the storage resources of the cloud service provider, which defines a cloud storage system 130. The cloud storage system 130 refers to the ability of operating specific storage access operations to different types of storage resources, in a way that manages the interface of storage access operations between application 108 and the various types of storage resources that may be offered by a cloud storage provider. In this example, without limitation to other types of storage resources, the storage resources include object storage 134 and block storage 136.

Object storage 134 is a type of storage provided by the cloud service provider, and is optimized for writing larger chunks of data. The larger chunks of data, are currently associated with sequentially written data for objects, such as photos, videos, images, and other types of digital content. As such, performance provided by object storage 134 is optimized for writing this type of larger content, e.g. being at least one megabyte or larger. Consistent with this optimization of object storage 134, if data is written to object storage 134 in a format that is not of larger chunks of data, the object storage 134 may be operating at a less than optimal configuration. As will be described in greater detail below, the storage application 106 is configured to utilize object storage 134 and in an optimize manner, e.g., by sequentially writing larger chunks of data in the form of data segments.

As further shown, object storage 134 is typically provided in the form of volumes 138. Volumes may be used by the storage application 106 to write specific types of data, such as data for specific applications 108. In some embodiments, other volumes of object storage 134 may be used for other types of applications 108. In alternative examples, storage application 106 can write to multiple volumes, such as to stripe data in accordance with specific writing techniques. Broadly speaking, object storage 134 may be defined by one or more volumes, and the object storage 134 may be distributed among one or more data centers, where such storage resources provided to one or more applications 108.

Block storage 136 is a type of storage provided by the cloud service provider, and is optimized for writing smaller block data, e.g., such as that produced by applications or processes that generate random input/outputs (I/Os). Block storage 136, similar to object storage 134, is in one embodiment also provided with the capability of assigning one or more volumes 140 and 142 for the type of data stored in block storage 136. Additionally, block storage 136 may be further separated into different performance tiers, such as the example performance tier I associated with volumes 140, and performance tier II associated with volumes 142. These performance tiers are designed to provide a different type of block storage capability for applications 108 that utilize storage resources of the cloud service provider. In accordance with one embodiment, it is possible to allocate certain volumes 140 to performance tier I, and allocate certain other volumes 142 to performance tier II.

It should be appreciated that block storage 136 can also have further levels of performance tiers, depending on the storage resources provided by the cloud storage provider. In some embodiments, the different types of block storage provided as storage resources are referred to as elastic block storage, since they are individually provisioned for the types of storage requirements desired by the application 108 or multiple applications 108. In some embodiments, different types of block storage 136 may be configured from different types of physical storage, such as hard disk drives, solid-state drives, faster solid-state drives, nonvolatile memory, and other types of memory or drive structures. Most commonly, block storage 136 is partitioned into different types of solid-state drives, each type having different levels of performance, e.g., performance tiers.

In one embodiment, the storage application 106 will utilize block storage 136, and specifically different types of performance tiers within block storage 136 to optimize storage transactions required by application 108. By incorporating storage application 106 as a layer between the application 108 and the storage resources, a cloud storage system 130 is defined, which handles the storage access requirements of application 108 and other applications that may be executing on cloud compute nodes of a cloud infrastructure, provisioned by a cloud service provider.

Figure 3:
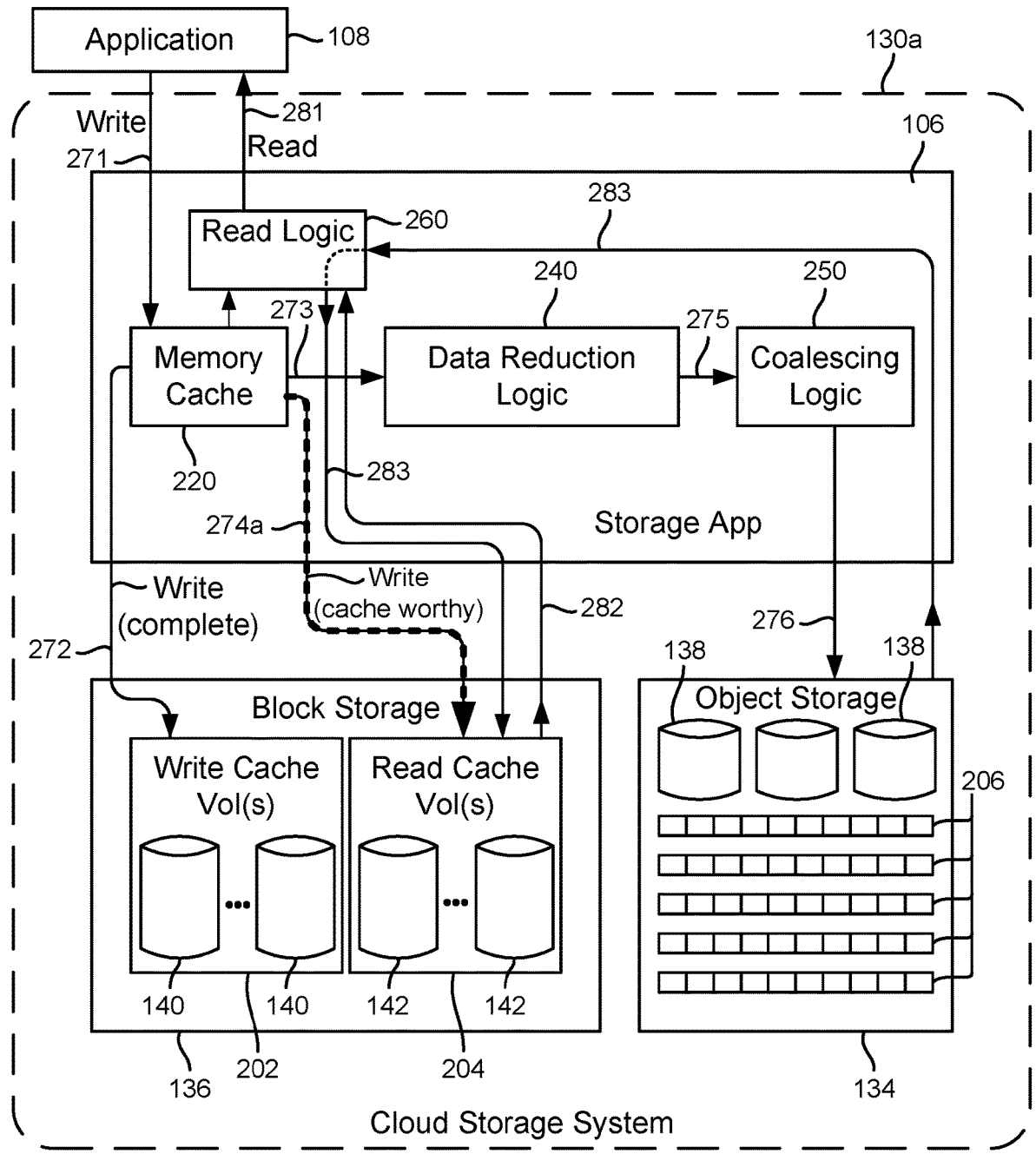
FIG. 3 illustrates an example configuration of cloud storage system, which is configured to include storage application for processing writes and reads between application and storage resources of the cloud service provider.

FIG. 3 illustrates an example configuration of cloud storage system 130a, which is configured to include storage application 106 for processing writes and reads between application 108 and storage resources of the cloud service provider. In this example, application 108 is shown processing a write operation 271 and a read operation 281. As shown, the write operation 271 and the read operation 281 each interface with storage application 106, which in turn access block storage 136 and object storage 134, depending on the write or read flow. In an example write operation 271, the write operation begins by receiving a write command from the application 108, which is designed to write an amount of data to the storage resources of the cloud infrastructure. The write operation 271 shows the flow of block data from the application 108 directed to memory cache 220. Memory cache 220 is random access memory (RAM) that is utilized as part of the compute node in which the storage application 106 is operating on the cloud infrastructure.

Memory cache 220 is operating, in this example, as a shadow RAM, as the data that is written from the application 108 is fully stored in memory cache 220, and also written to write cache 202 of block storage 136. In this configuration, the write operation also asked to write 272 the complete data to the write cache 202, which may be stored in one or more volumes 140. As mentioned above, block storage 136 may be defined to include different types of volumes, which may have different levels of performance. By way of example, the write cache 202 may be defined from solid-state drives that are slightly slower than solid-state drives that define a read cache 204, which utilizes volumes 142. In one configuration, the write cache 202 is smaller in size than the read cache 204, but the read cache 204 is much faster than the write cache 202, so as to enable quicker read operations when the application 108 is reading from the block storage 136, volume(s) 140, in the form of read cache 204.

As mentioned above, memory cache 202 will hold the complete set of the data written by the application 108, and that data is transferred via path 273 to a data reduction logic 240. Data reduction logic 240, in one embodiment, is configured to perform a compression of the data blocks written to memory cache 220. In another embodiment, data reduction logic 240 may perform a de-duplication operation on the data blocks written to memory cache 220, and in still other embodiments, a combination of compression and de-duplication may be performed by data reduction logic 240. Once data reduction is completed by data reduction logic 240, the reduced data blocks are transferred via 275 to coalescing logic 250. Coalescing logic 250 is configured to perform sequential organization of the data blocks, and collect a sufficient number of data blocks to assemble a data segment.

In one embodiment, a data segment is defined to have a size that is at least 1 MB or larger, and is optimized to make efficient utilization of the object storage 134. In one embodiment, the coalescing logic 250, organizes the data blocks in sequential order, and also ensures that the data segment is of sufficient size before being written to object storage 134. In some embodiments, the data segments can be as large as 4 MB or larger, but generally at least in the order of 1 MB to make the object storage writing process efficient. In one embodiment, the coalescing logic 250 may be configured to produce objects in a form of a fully Log Structured Filesystem (LFS). In other words, every time data is written down to object storage, it's done so in an optimally sized sequential stripe offering improved write performance (e.g., thousands of IOPS). In other embodiments, the objects produced by coalescing logic 250 will provide data segments that are defined by two or more data blocks.

The data reduction logic 240 and the coalescing logic 250, when processed by storage application 106, operates on the data blocks in memory, e.g., RAM, before the data is transferred via 276 to the object storage 134 in the form of data segments 206. The data segments 206 are logically written to volumes 138 within object storage 134. As mentioned above, because the data being written to object storage 134 is of larger sizes, and sequential organization, the writing by the object storage 134 is more efficient. By way of example, if the physical media of object storage 134 includes hard disk drives, the writing heads of the hard disk drives will be more efficient in writing sequential sectors of data corresponding to the data segments 206 being written by the storage application 106.

Continuing with the writing operation 271 of FIG. 3, select data written to memory cache 220 is also separately written to the read cache 204 of the block storage 136. This is shown by flowline 274a, which is designated as a write of cache worthy data. As used herein, block data that is cache worthy is typically block data that is likely to be actively read by the application 108, or based on processing, is identified as related to a process or application that is ongoing or is associated with blocks of data that are considered hot, and would be read relatively soon by application 108 or other applications. Thus, the block data written to read cache 204 is considered to be cache worthy, and is thus stored in read cache 204 that is provisioned with faster solid-state drives, in association with volumes 142 of object storage 134.

With reference to the read operation 281, a flow is processed by read logic 260 of the storage application 106. The read logic 260 is configured to coordinate reading operations from either block storage 136 or object storage 134, in a manner that makes it efficient for returning requested data to the application 108. In one example, read logic 206 responds to the read command provided by read operation 281, which requests certain data blocks from storage. In a first attempt to serve the data rapidly, read logic will read from memory cache 220 to determine whether the requested data is still present in memory cache 220. If it is determined that memory cache 220 does not have the requested data, the read logic will process a read 282 from the read cache 204 of the block storage 136.

If the data is present in the read cache 204, the data is served back by read logic 206 to application 108. If it is determined that the read cache 204 does not contain the requested data blocks, read logic 260 will read from object storage 134. Read logic 260, will then read the requested data blocks from object storage 134 via path 283 and return them to the application 108, servicing the read command. However, because the read cache 204 did not contain the requested data blocks for the read command, storage application 106 will cause the recently read data from object storage 134 to be written via path 283 back to the read cache 204. In this manner, if the data blocks are requested again by the application 108, the data blocks will be present in the read cache 204, which will be a quicker response for read logic 260 back to application 108.

From the above described read processing operations, it should be apparent that efficient utilization of storage resources of a cloud storage provider is enabled by storage application 106, which sits as a layer between the application 108 and the physical storage provisioned for application 108 by the cloud infrastructure. From the standpoint of writing operations, the storage application optimizes writing of data blocks directly to block storage 136 for efficient and quick storage of random I/O type writes. The storage application 106 also utilizes memory cache 220 to provide efficient acknowledgments back to the application 108, once the block data is written to memory cache 220. At the same time, data written to that memory cache 220 is also written to the write cache 202 of block storage 136.

Further optimized is the writing of cache worthy block data to the read cache 204, to enable fast read responses by read logic 260, in response to read commands issued by application 108. Still further, storage application 106 provides optimization to coalesce block data before writing to object storage 134. In one embodiment, data reduction operations associated with data reduction logic 240 are optional. However, the coalescing logic 250 is efficiently provided to ensure that data written to object storage 134 is in the form of data segments, which are sufficiently of larger size chunks to make efficient utilization of the type of storage infrastructure provided for object storage 134. Therefore, utilization of storage application 106, for facilitating writes and reads between application 108 and storage resources, define a cloud storage system 130a, which utilizes different types of storage resources, to functionally optimize the data storage access needs of application 108, which is also operating in a cloud processing node of the cloud service provider.

Figure 4:
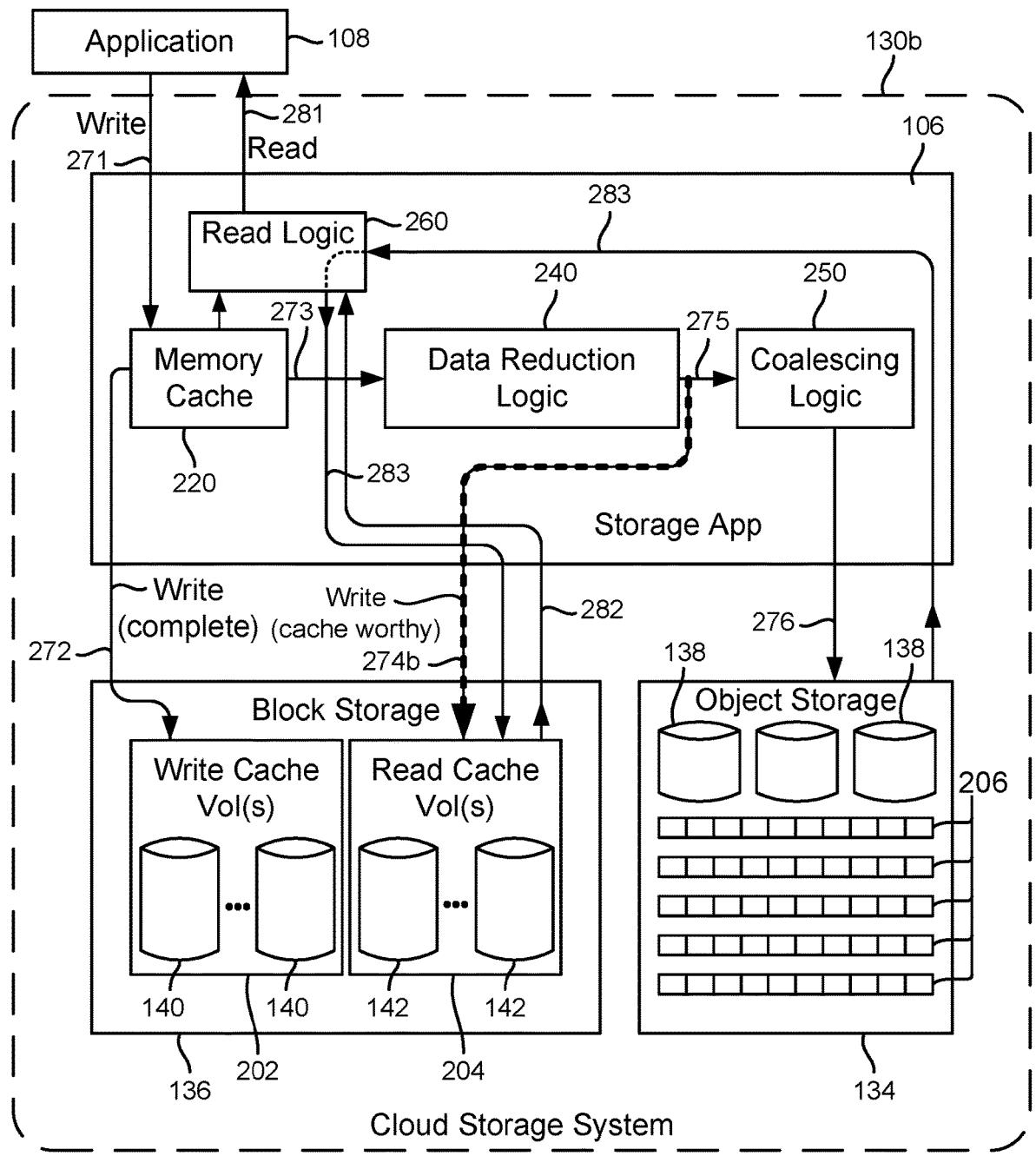
FIG. 4 illustrates another embodiment for optimizing the utilization of storage resources provisioned by a cloud storage provider.

FIG. 4 illustrates another embodiment for optimizing the utilization of storage resources provisioned by a cloud storage provider. In this example, application 108 also utilizes storage application 106, to facilitate the writing operations and reading operations to and from the block storage 136 and object storage 134. However, in this embodiment, the writing of cache worthy data via path 274b to the read cache 204 is delayed until after data reduction logic 240 operates on the block data. For example, by processing the selective write of cache worthy data until after data reduction logic 240 operates on the block data, allows for more efficient utilization of the block storage volumes 142 that are designated for the read cache 204.

By way of example, if the data reduction logic 240 implements a compression or de-duplication process, or both, the data being written to the read cache 204 will be reduced, therefore making more efficient utilization of the allotted storage capacity provided by block storage 136, and in particular the read cache 204 of block storage 136. As mentioned above, it is possible to eliminate data reduction logic 240, and in which case the cache worthy data would be written from memory cache 220 via path 273. In either case, block storage 136 is provided and designed to receive data blocks from application 108 or other applications 108, which may be writing random I/O or nonrandom I/O to the storage allocated to it by the cloud storage provider. Storage application 106 is therefore configured, as a layer between the application 108 or other applications 108, and the different types of storage resources that may be provision for the applications, or a specific customer that is running certain applications.

Again, the coalescing logic 250 is configured to assemble blocks of data, in one embodiment, in a sequential ordered manner so that the storage hardware of the object storage 134 can more efficiently write these larger chunks of data. The cloud storage system 130b, therefore defines a layer that allows for efficient handling of reads and writes between applications in a cloud system that are accessing storage in the cloud system. The efficient utilization, as mentioned above, will act to reduce processing power by the hardware associated with the storage resources, and also optimize the utilization of those storage resources based on their intended use and/or physical construction. An additional savings to customers that utilize storage application 106 in conjunction with their use of provisioned cloud storage, is the ability to reduce the utilization of the storage resources in ways that are not intended and may end up costing more in money charged to the customer. By way of example, if the storage resources are not utilized in an efficient manner, customers may be utilizing the storage resources in ways that the storage service provider will charge more per amount of data stored or accessed.

As such, the embodiments described herein provide optimizations in various levels, including technology, storage utilization, power savings, cost savings, and flexibility and configuration. As mentioned above, the storage application 106 may be configured based on changes in the data resource needs a certain applications, from time to time, based on learned usage patterns, based on analysis of uses patterns of other systems, and the like. More information regarding these types of analytics are described below with reference to FIG. 8.

Figure 5:
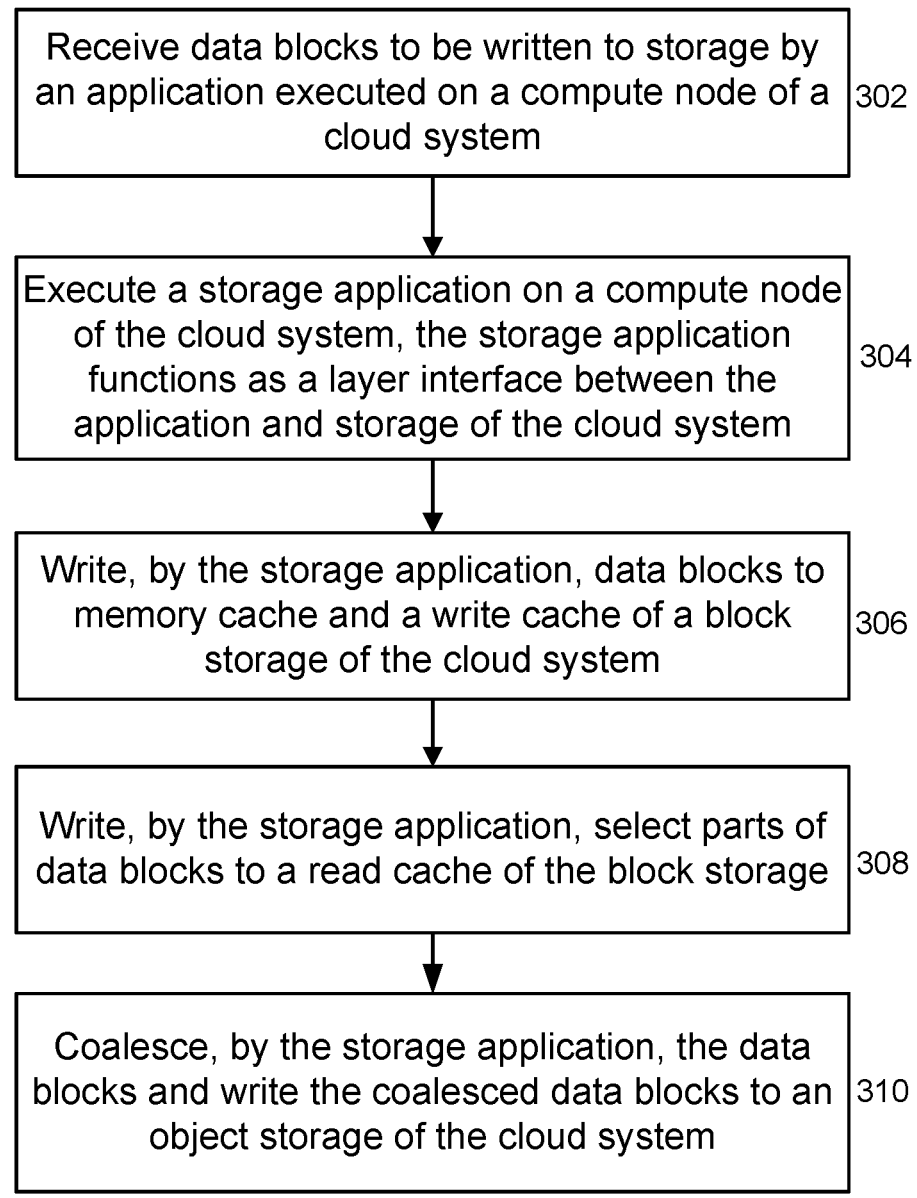
FIG. 5 illustrates an example process for executing operations provided by storage application, in accordance with one embodiment.

FIG. 5 illustrates an example process for executing operations provided by storage application 106, in accordance with one embodiment. In operation 302, data blocks are received to be written to storage by an application executed on a compute node of a cloud system. The application may, for example, send a write command or multiple write commands to the storage provided by the cloud system. In operation 304, a storage application is executed on a compute node of the cloud system. The storage application functions as a layer interface between the application and the storage of the cloud system. As mentioned above, writes and reads provided from and to an application 108 are handled by storage application 106. Storage application 106 provides the functional logic for determining what type of storage will be used for specific processes of the writing and reading. In operation 306, data blocks to be written are handled by the storage application, and are written to memory cache and also to write cache of a block storage provided by the cloud system.

In operation 308, are written to a read cache of the block storage. In one embodiment, the select parts of data blocks, correspond to cache worthy data. Cache worthy data is data that is most likely to be accessed frequently or is likely to be accessed soon in the future, and is therefore stored in read cache of the block storage. In operation 310, the data blocks being written are coalesced by the storage application in order to generate coalesced data blocks and then are then written to object storage of the cloud system. As described above, the operation of coalescing data blocks includes arranging data blocks in sequential order, and then writing the coalesced data blocks as a data segment to the object storage.

As mentioned above, the object storage is, in one embodiment, optimized to write larger chunks of data, e.g., greater than 1 MB, and therefore the coalescing function organizes segment data in a manner that is most efficient for writing to object storage. In other embodiments, the segment data is processed to generate sizes that are 4 MB or larger. In some cases, remaining data that cannot generate full segment data may be smaller than 1 MB. In contrast, data blocks may be in the neighborhood of about 4 kB, and in some cases less than 100 kB.

These mentioned sizes for segment data and block data are only provided by way of example, and should not limit implementations that use different size blocks or segment data. It is believed, however, that the generation of segment data for writing to object storage improves the utilization of object storage. And, segment data is, in one embodiment, defined from two or more blocks of data, which may or may not be compressed.

Figure 6:
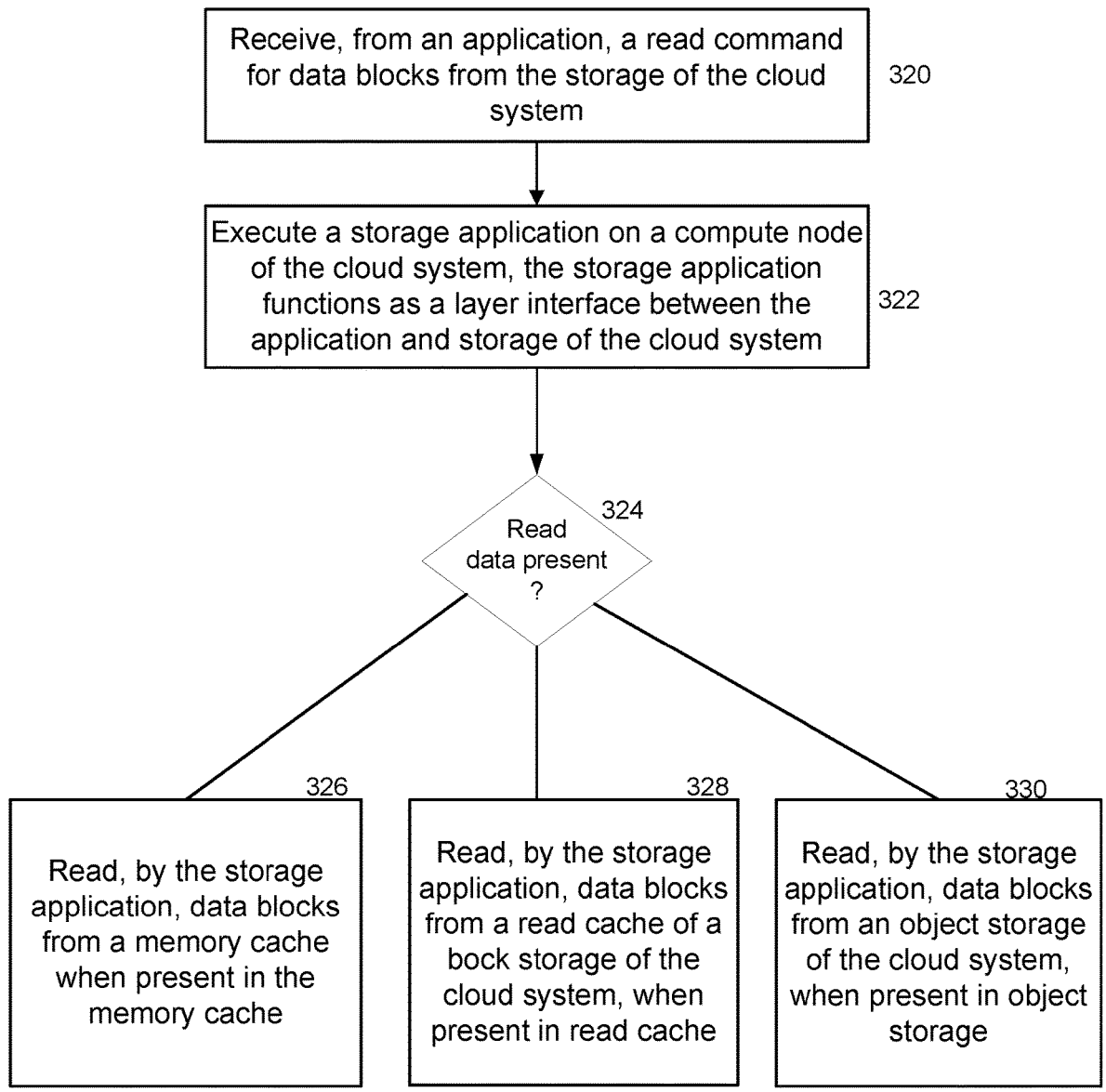
FIG. 6 illustrates an example flow diagram of a read operation, handled by logic of the storage application, in accordance with one embodiment.

FIG. 6 illustrates an example flow diagram of a read operation, handled by logic of the storage application 106, in accordance with one embodiment. In operation 320, a read command is received from an application. The read command is for data blocks from the storage of the cloud system. In operation 322, a storage application is executed on a compute node of the cloud system. The storage application functions as a layer interface between the application and the storage of the cloud system. In operation 324, logic is executed to determine the location of the data being requested in the read command. First, the read attempt is made to the memory cache in operation 326, which is RAM provided to the compute node in which the storage application 106 is executing.

As described above, the memory cache 220 may contain the data blocks requested by the read command. If the memory cache does not have the data being requested, the operation 328 is executed, where an attempt to read the data blocks is made to a read cache of the block storage provided by the cloud system. If the data is present in read cache, the data is served back to the application. If the data is not present in the read cache, the read operation proceeds to read from the object storage. If the data is found in the object storage, the data is returned back to the application, and that same data is written back to the read cache. The data is written back to the read cache in order to have it ready for a subsequent read, since that data may be accessed more frequently. In this manner, subsequent reads may read the data quicker from the read cache, then requiring access from object storage.

It should be understood that the cloud storage system 130, 130*a*, and 130*b* described above are defined from storage resources provided by a cloud service provider, and namely the cloud infrastructure. The applications 108 operate in compute nodes, e.g. virtual machines, of the cloud service provider. The storage application 106, similarly operates in a compute node, e.g. virtual machine, of the cloud service provider. The applications 108, are configured to be mapped to the services provided by the storage application 106, to provide access to the storage resources, as described above. The infrastructure utilized by the actual storage resources may vary, and may be defined and individually provisioned by the cloud service provider. The cloud service provider, in its data centers, will utilize storage arrays that are defined from physical storage media. The storage arrays can be optimized in various ways. For instance, some storage arrays may be defined by hard disk drives, some storage arrays may be defined by solid-state drives, and some storage arrays may be defined as hybrid arrays, which include both hard drives and solid-state drives.

For purposes of completeness, the following discussion refers to attributes of a physical storage array, which may be utilized as a storage resource in the cloud infrastructure of the cloud service provider. In some embodiments, reference to NVRAM, in the context of the storage array 502, may parallel operations performed by memory cache 220 of the storage application 106. Cache worthy data written to solid-state drives in the storage array, will resemble operations that are performed when writing to the read cache 204 in a cloud storage system. Data written to the object storage 134, may parallel operations when data is written to the hard disk drives 532 in the storage array 502. Some of these operations performed by the storage application 106, in one embodiment, parallel to (at least in part) operations that are processed by a cache accelerated sequential layout (CASL) algorithm described below. It should be understood, that the CASL algorithm described with reference to the storage array 502 may not be identical to the operations performed by the storage app 106, but certain of the concepts may be implemented, or replaced, or substituted for operations performed by the storage application 106. With the foregoing in mind, the following description is with reference to a storage array 502.

Figure 7:
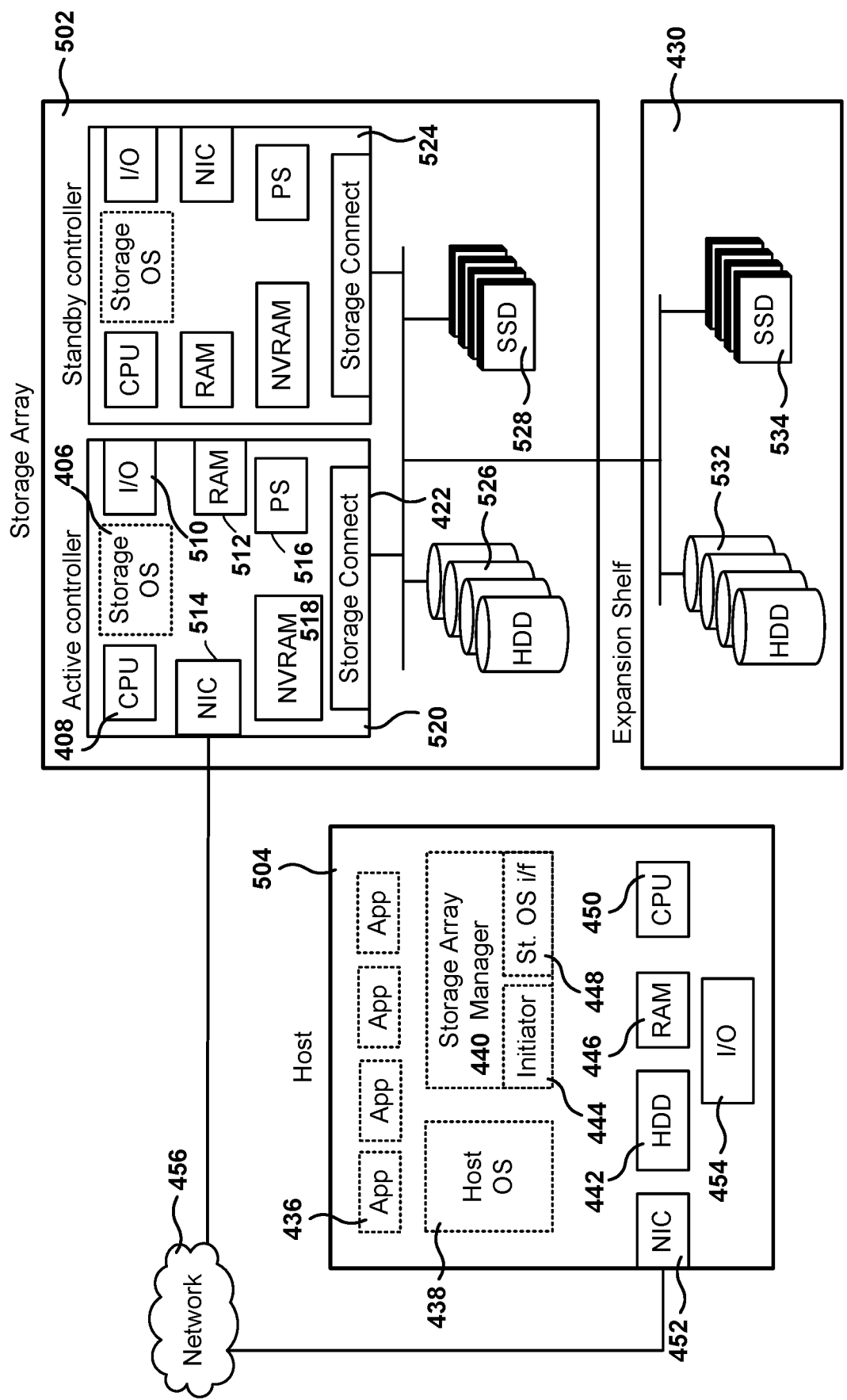
FIG. 7 illustrates an example architecture of a storage array, according to one embodiment.

FIG. 7 illustrates an example architecture of a storage array 502, according to one embodiment. In one embodiment, storage array 502 includes an active controller 520, a standby controller 524, one or more HDDs 526, and one or more SSDs 528. In one embodiment, the controller 520 includes non-volatile RAM (NVRAM) 518, which is for storing the incoming data as it arrives to the storage array. After the data is processed (e.g., compressed and organized in segments (e.g., coalesced)), the data is transferred from the NVRAM 518 to HDD 526, or to SSD 528, or to both.

In addition, the active controller 520 further includes CPU 408, general-purpose RAM 512 (e.g., used by the programs executing in CPU 408), input/output module 510 for communicating with external devices (e.g., USB port, terminal port, connectors, plugs, links, etc.), one or more network interface cards (NICs) 514 for exchanging data packages through network 456, one or more power supplies 516, a temperature sensor (not shown), and a storage connect module 422 for sending and receiving data to and from the HDD 526 and SSD 528. In one embodiment, the NICs 514 may be configured for Ethernet communication or Fibre Channel communication, depending on the hardware card used and the storage fabric. In other embodiments, the storage array 502 may be configured to operate using the iSCSI transport or the Fibre Channel transport.

Active controller 520 is configured to execute one or more computer programs stored in RAM 512. One of the computer programs is the storage operating system (OS) used to perform operating system functions for the active controller device. In some implementations, one or more expansion shelves 430 may be coupled to storage array 502 to increase HDD 532 capacity, or SSD 534 capacity, or both.

Active controller 520 and standby controller 524 have their own NVRAMs, but they share HDDs 526 and SSDs 528. The standby controller 524 receives copies of what gets stored in the NVRAM 518 of the active controller 520 and stores the copies in its own NVRAM. If the active controller 520 fails, standby controller 524 takes over the management of the storage array 502. When servers, also referred to herein as hosts, connect to the storage array 502, read/write requests (e.g., IO requests) are sent over network 456, and the storage array 502 stores the sent data or sends back the requested data to host 504.

Host 504 is a computing device including a CPU 450, memory (RAM) 446, permanent storage (HDD) 542, a NIC card 452, and an IO module 454. The host 504 includes one or more applications 436 executing on CPU 450, a host operating system 438, and a computer program storage array manager 440 that provides an interface for accessing storage array 502 to applications 436. Storage array manager 440 includes an initiator 444 and a storage OS interface program 448. When an IO operation is requested by one of the applications 436, the initiator 444 establishes a connection with storage array 502 in one of the supported formats (e.g., iSCSI, Fibre Channel, or any other protocol). The storage OS interface 448 provides console capabilities for managing the storage array 502 by communicating with the active controller 520 and the storage OS 406 executing therein. It should be understood, however, that specific implementations may utilize different modules, different protocols, different number of controllers, etc., while still being configured to execute or process operations taught and disclosed herein.

In some embodiments, a plurality of storage arrays may be used in data center configurations or non-data center configurations. A data center may include a plurality of servers, a plurality of storage arrays, and combinations of servers and other storage. It should be understood that the exact configuration of the types of servers and storage arrays incorporated into specific implementations, enterprises, data centers, small office environments, business environments, and personal environments, will vary depending on the performance and storage needs of the configuration.

In some embodiments, servers may be virtualized utilizing virtualization techniques, such that operating systems can be mounted or operated using hypervisors to allow hardware and other resources to be shared by specific applications. In virtualized environments, storage is also accessed by virtual hosts that provide services to the various applications and provide data and store data to storage. In such configurations, the storage arrays can be configured to service specific types of applications, and the storage functions can be optimized for the type of data being serviced.

For example, a variety of cloud-based applications are configured to service specific types of information. Some information requires that storage access times are sufficiently fast to service mission-critical processing, while other types of applications are designed for longer-term storage, archiving, and more infrequent accesses. As such, a storage array can be configured and programmed for optimization that allows servicing of various types of applications. In some embodiments, certain applications are assigned to respective volumes in a storage array. Each volume can then be optimized for the type of data that it will service.

As described with reference to FIG. 7, the storage array 502 can include one or more controllers 520, 524. One controller serves as the active controller 520, while the other controller 524 functions as a backup controller (standby). For redundancy, if the active controller 520 were to fail, immediate transparent handoff of processing (i.e., fail-over) can be made to the standby controller 524. Each controller is therefore configured to access storage, which in one embodiment includes hard disk drives (HDD) 526 and solid-state drives (SSD) 528. As mentioned above, SSDs 528 are utilized as a type of flash cache, which enables efficient reading of data stored to the storage.

As used herein, SSDs functioning as "flash cache," should be understood to operate the SSD as a cache for block level data access, providing service to read operations instead of only reading from HDDs 526. Thus, if data is present in SSDs 528, reading will occur from the SSDs instead of requiring a read to the HDDs 526, which is a slower operation. As mentioned above, the storage operating system 406 is configured with an algorithm that allows for intelligent writing of certain data to the SSDs 528 (e.g., cache-worthy data), and all data is written directly to the HDDs 526 from NVRAM 518.

The algorithm, in one embodiment, is configured to select cache-worthy data for writing to the SSDs 528, in a manner that provides an increased likelihood that a read operation will access data from SSDs 528. In some embodiments, the algorithm is referred to as a cache accelerated sequential layout (CASL) architecture, which intelligently leverages unique properties of flash and disk to provide high performance and optimal use of capacity. In one embodiment, CASL caches "hot" active data onto SSD in real time—without the need to set complex policies. This way, the storage array can instantly respond to read requests—as much as ten times faster than traditional bolt-on or tiered approaches to flash caching.

For purposes of discussion and understanding, reference is made to CASL as being an algorithm processed by the storage OS. However, it should be understood that optimizations, modifications, additions, and subtractions to versions of CASL may take place from time to time. As such, reference to CASL should be understood to represent exemplary functionality, and the functionality may change from time to time, and may be modified to include or exclude features referenced herein or incorporated by reference herein. Still further, it should be understood that the embodiments described herein are just examples, and many more examples and/or implementations may be defined by combining elements and/or omitting elements described with reference to the claimed features.

In some implementations, SSDs 528 may be referred to as flash, or flash cache, or flash-based memory cache, or flash drives, storage flash, or simply cache. Consistent with the use of these terms, in the context of storage array 502, the various implementations of SSD 528 provide block level caching to storage, as opposed to instruction level caching. As mentioned above, one functionality enabled by algorithms of the storage OS 406 is to provide storage of cache-worthy block level data to the SSDs, so that subsequent read operations are optimized (i.e., reads that are likely to hit the flash cache will be stored to SSDs 528, as a form of storage caching, to accelerate the performance of the storage array 502).

In one embodiment, it should be understood that the "block level processing" of SSDs 528, serving as storage cache, is different than "instruction level processing," which is a common function in microprocessor environments. In one example, microprocessor environments utilize main memory, and various levels of cache memory (e.g., L1, L2, etc.). Instruction level caching, is differentiated further, because instruction level caching is block-agnostic, meaning that instruction level caching is not aware of what type of application is producing or requesting the data processed by the microprocessor. Generally speaking, the microprocessor is required to treat all instruction level caching equally, without discriminating or differentiating processing of different types of applications.

In the various implementations described herein, the storage caching facilitated by SSDs 528 is implemented by algorithms exercised by the storage OS 406, which can differentiate between the types of blocks being processed for each type of application or applications. That is, block data being written to storage 430 can be associated with block data specific applications. For instance, one application may be a mail system application, while another application may be a financial database application, and yet another may be for a website-hosting application. Each application can have different storage accessing patterns and/or requirements. In accordance with several embodiments described herein, block data (e.g., associated with the specific applications) can be treated differently when processed by the algorithms executed by the storage OS 406, for efficient use of flash cache 528.

Continuing with the example of FIG. 7, that active controller 520 is shown including various components that enable efficient processing of storage block reads and writes. As mentioned above, the controller may include an input output (IO) 510, which can enable one or more machines to access functionality of the storage array 502. This access can provide direct access to the storage array, instead of accessing the storage array over a network. Direct access to the storage array is, in some embodiments, utilized to run diagnostics implement settings, implement storage updates, change software configurations, and/or combinations thereof. As shown, the CPU 408 is communicating with storage OS 406.

Figure 8:
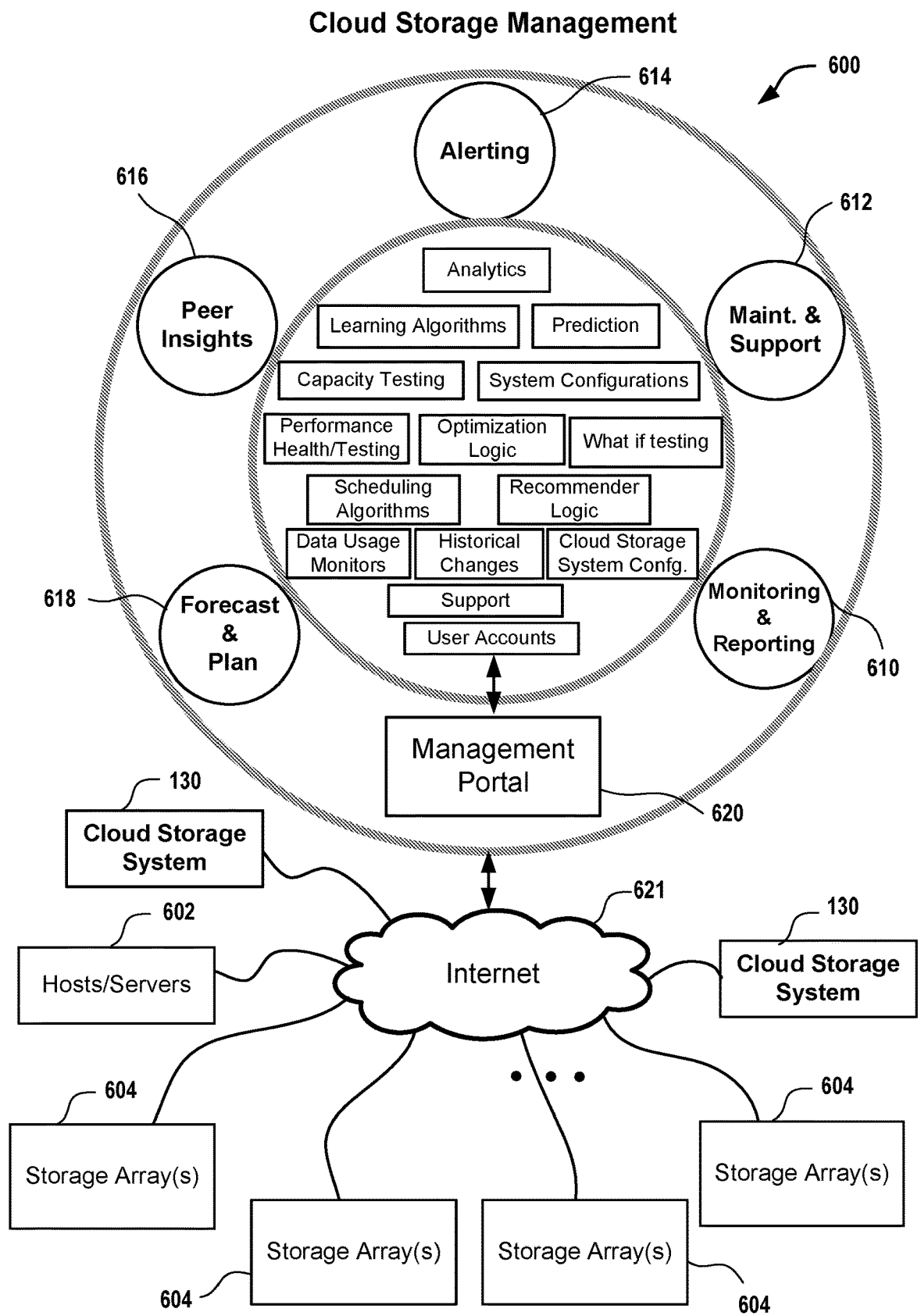
FIG. 8 illustrates an example of a cloud storage management system, which utilizes cloud storage processing to enable remote management of storage arrays, as well as cloud storage systems that may be implemented in a number of compute nodes, in accordance with one or more embodiments.

FIG. 8 illustrates an example of a cloud storage management system 600, which utilizes cloud storage processing to enable remote management of storage arrays, as well as cloud storage systems that may be implemented in a number of compute nodes, in accordance with one or more embodiments. As mentioned above, the cloud storage system is defined, in one configuration, by installing a storage application 106 in a compute node, e.g., a virtual machine, of cloud infrastructure of a cloud service provider. The storage application 106, in one embodiment, provides a layer that interfaces applications running on one or more virtual machines provisioned by the cloud service provider with storage of the cloud infrastructure. The storage application 106, in one embodiment, includes logic for communicating metadata regarding the storage handling with another process executing cloud storage management. By way of example, the other process executing the cloud storage management may be executed on the same cloud infrastructure of the cloud service provider, or may be executed on a remote server, or may be executed by a private server (virtualized or not) of the storage services provider that developed the storage application 106.

By way of example, the storage services provider may be the applicant of the present application, i.e., Nimble Storage Inc. The applicant of the present application may provide the operational components for the storage application 106, e.g., application loaders/installers, application engines, plug-ins, software, and/or containers, etc., for execution on compute node(s) of the cloud infrastructure. In one embodiment, the storage application 106 may operate as software as a service (SaaS), wherein the storage application 106 provides the functional and seamless interface between the application(s) 108 and the storage resources provides by the cloud infrastructure. The storage application 106 may be deployed in any number of cloud infrastructures, i.e., cloud infrastructures run by different cloud services providers. Today, well known cloud service providers include, by way of example and not limited in any way to many others, Amazon Web Services (AWS) by Amazon Inc., Google Cloud Platform or GCE/GCS, by Google, Inc., Microsoft cloud or Azure, by Microsoft Inc., etc.

In one embodiment, the cloud storage management system 600 executes a management portal 620 which provides access over the Internet, or local area networks (LAN), or wide area networks (WAN), and combinations thereof.

As shown, exemplary hosts and servers 602 are in communication with the Internet and are configured to provide services to a plurality of clients. As noted above, the clients access the Internet to utilize applications, services, processing, content, and share information and data. The data being accessed and shared or processed may be stored in a plurality of storage arrays 604 or may be gathered from installed storage applications 106, each of which may be functioning as a cloud storage system 130. Management of the data from cloud storage systems 130 is provided by enabling communication between the storage applications 106, when it is serving storage needs for one or more applications 108. Over time, the storage processing providing by storage application 106 can act to collect metadata that is useful to identify trends, storage needs, capacity requirements, and usage of different types of storage resources, e.g., block storage, object storage, or even long term storage. In some cases, this metadata gathered from installed storage applications 106 can be analyzed to find trends, project needs, or even instruct a change in the way storage resources are used.

In still other embodiments, the metadata can be used to generate recommendations to users of the application 106, which may optimize the way storage resources are used in the cloud infrastructure. In other embodiments, the received metadata is used to make dynamic changes to provisioned storage resources. For instance, if less block storage is used than what was initially provisioned, the amount of block storage reserved or paid for by the customer executing application 108 can be adjusted. This can provide for further costs savings, as adjustments can be made dynamically and in some embodiments, continuously to provide fine grain changes and modifications.

In some embodiments, in addition to receiving metadata from storage applications 106, metadata can also be received from storage arrays 604. These storage arrays may be installed in customer locations (i.e., companies or datacenters). In some embodiments, customers that use the storage application 106 or use a supported storage array 604, may be provided with access to a management portal 620. For example, the storage arrays 604 and the compute nodes that operate storage applications 106 may connect to a network 621, and in turn share information with a cloud storage management system 600. The cloud storage management system 600 is configured to execute a plurality of functions and algorithms to facilitate management of the storage application 106 (e.g., the cloud storage systems 103) and storage arrays 604 which may be deployed in various configurations, locations, datacenters, implementations, and other constructs. In some cases, a customer may not have storage arrays 604 provisioned, and the only information provided by the cloud storage management system 600 is with regard to one or more cloud storage systems 103.

In some embodiments, applications 108 may be used to service real-time data delivery to various applications over the Internet, such as on-demand applications, gaming systems, websites, streaming networks, video content delivery systems, audio content delivery systems, database information, business metrics, remote desktop applications, virtualized network infrastructures, and other storage related functions and/or Internet and website related processing. All of this processing may generate unique types of traffic flows and unique demands on cloud storage infrastructure. As such, the storage application 106 is well suited in the write and read data path, to track storage usage metrics. These metrics are broadly referred to as metadata, which is collected by the cloud storage management. As mentioned above, the cloud storage management may be operating on a different machine, in the same cloud infrastructure, or a different cloud infrastructure. The metadata, no matter where collected and processed, can be used to generate the aforementioned recommendations and/or dynamic changes to the usage of storage (i.e., usage of block storage and usage of object storage, in the context of a cloud storage system 103).

In some implementations, the cloud storage management 600 can include and process various modules to assist in efficient management of cloud storage systems 103 and/or storage arrays 604. Without limitation, the following are certain types of processing algorithms and methods that can be executed by the cloud storage management system 600, based on metadata received. These examples can include analytics processing to determine usage of storage, similarities in usage of storage by different applications 108, performance of applications based on certain configuration sets, and other modifications and analytics associated therewith. Still further, the cloud storage management system 600 can also include logic for processing learning algorithms.

The learning algorithms can be utilized to determine when certain configurations of storage should be implemented, based on previous settings and/or changes made by the same implementer of the storage application 106 or by looking for similarities and changes made or settings made by other storage application 106 implementers or users. Algorithms can also be used to predict when certain settings should be changed. These predictions can be ranked based on the success of certain changes over time, and based on the success experienced by such specific changes.

In another embodiment, capacity testing can also be performed by the cloud storage management system 600, and this testing can occur based on the demands being made on the storage, the types of applications being run, and the stress that the storage system 103 has been placed under. System configurations can also be reviewed dynamically by the cloud storage management system so as to determine if the right consistent configurations have been set, and/or provide recommendations for changes. Additional performance and health testing algorithms can also be run by querying and sending data, commands, analytics requests and other logic and data to and from the storage application 106. In one embodiment, recommendations can be sent to administrators of applications 108 and/or users of storage application 106, who may determine to implement or not implement certain recommendations and/or settings. In other embodiments, certain upgrades, changes, modifications and/or the like, can be implemented based on pre-defined settings, authorizations, or implicit settings and/or authorizations by a user, IT manager, storage manager, data center manager, or other authorized storage management personnel. Still further, the cloud storage management system 600 can also manage historical changes made, and determine when changes have been successful or have reduced the performance and/or goal desired by the implementing individual.

By analyzing historical changes and/or data from various cloud storage systems 130 (even when the cloud storage systems are operated by different entities), it is possible to identify optimizations at cross points or intersections of efficiencies, and such data can be used to provide recommendations for improved optimizations. The system can also include scheduling algorithms which can be used to automatically communicate with the storage application 106, collect data, run additional applications or routines, run logic, collect data, send optimizations, make recommendations, and/or adjust settings. In some embodiments, the management portal can also access support data which may be optimized for specific user accounts. For example, some analytics, data processing, optimizations, what if testing, recommender logic, and other functions can be limited to specific accounts, based on their level of service desired. In some embodiments, higher levels of service or support can be given higher levels of feedback by the cloud storage management system 600.

Broadly speaking, the functionality of the various algorithms managed by the cloud storage management system 600 can be used to provide specific functionality. Example functionality may include monitoring and reporting functions 610, maintenance and support functions 612, alerting functions 614, peer insights 616, and forecasting and planning 618. These various functions can take and use logic described above and defined within the inner diagram of the cloud storage management system 600. In various examples, the portal management can provide access to the plurality of user interface screens with selection boxes, setting boxes, metrics analysis, diagrams, charts, historical data, alerts, recommendations, and other user interface and/or command-line data. In other embodiments, changes to the cloud storage system 103 can be made, e.g., by changing configuration data.

In one embodiment, the storage lifecycle data (e.g., historical data, metadata, etc.) is leveraged to enable deep analysis of data regarding a storage application 106. This analysis enables the automation and integration of data mining from storage application 106 usage and functionality to automate and simplify storage administrative tasks. For instance, by analysis of metadata across various storage applications 106, it is possible to predict when configuration issues may arise for particular customer configurations. In some embodiments, this information may be used to determine when upgrades from one configuration (e.g., software and/or hardware) are recommended or when certain upgrades should be avoided. In one embodiment, having access to metadata of other applications 106 and/or other arrays 604 (e.g., across many disparate installations) allows for efficient diagnosis of current issues, potential issues or recommendations to ensure optimal health of particular cloud implementations of cloud storage systems 130.

Figure 9A:
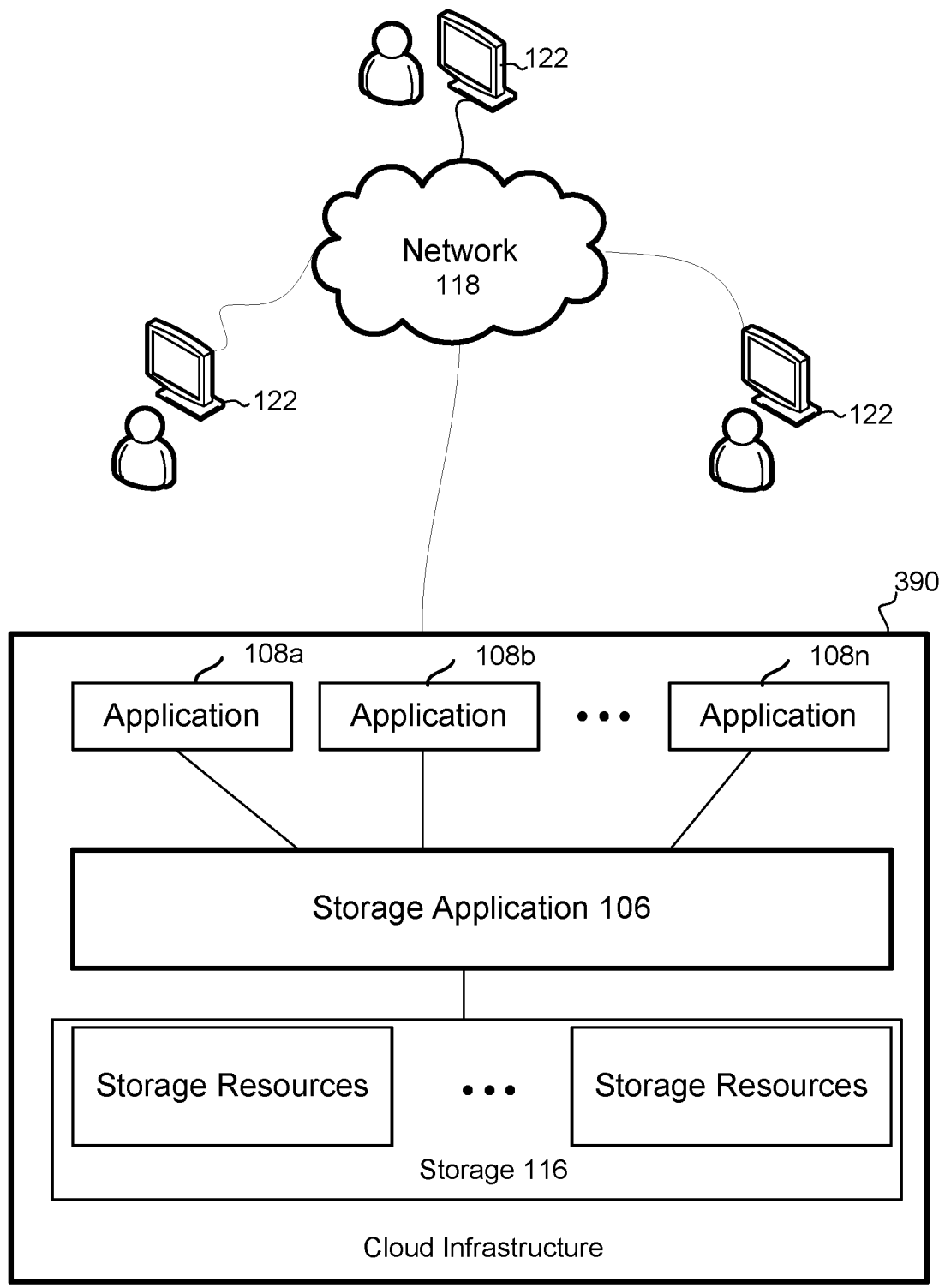
FIG. 9A illustrates a block diagram of cloud infrastructure, including storage application that services storage access for applications.

FIG. 9A illustrates a block diagram of cloud infrastructure 390, including storage application 106 that services storage access for applications. As shown, the storage application 106 and the applications 108a-108n can be executed on compute nodes of the cloud infrastructure 390. The storage resources, which can include block storage 136, object storage 134, and other types of storage, can be provided by the cloud infrastructure 390 in the form of storage 116. As described above, the storage application 106 is configured as a servicing entity or later, that provides more efficient access of storage 116 to the various applications 108. As mentioned above, the applications 108a-108n can be of different types. In some embodiments, the applications 108 can be processed for the same entity or customer, and in other embodiments, the applications 108 can each be associated with different customers or entities.

By way of example, application 108a can be executed for a video streaming company, which provides video streaming to its customers. Application 108b, may be a database application, which may be executed for a banking entity or customer of the cloud infrastructure 390. In other embodiments, applications 108a and 108b may simply execute different business applications for the same customer, such as a technology company. Having the storage application 106 executing as the intermediate layer between the storage 116 and the applications 108, therefore provides for the efficient utilization of storage resources.

Although the cloud infrastructure 390 is illustrated as a single block diagram of storage 116, it should be understood that the cloud infrastructure 390 may be defined by multiple data centers, and network interconnections. In such a configuration, storage application 106 may be executed in multiple data centers, such that applications 108 requiring storage access in the various data centers, can be provided with efficient utilization of storage resources.

Figure 9B:
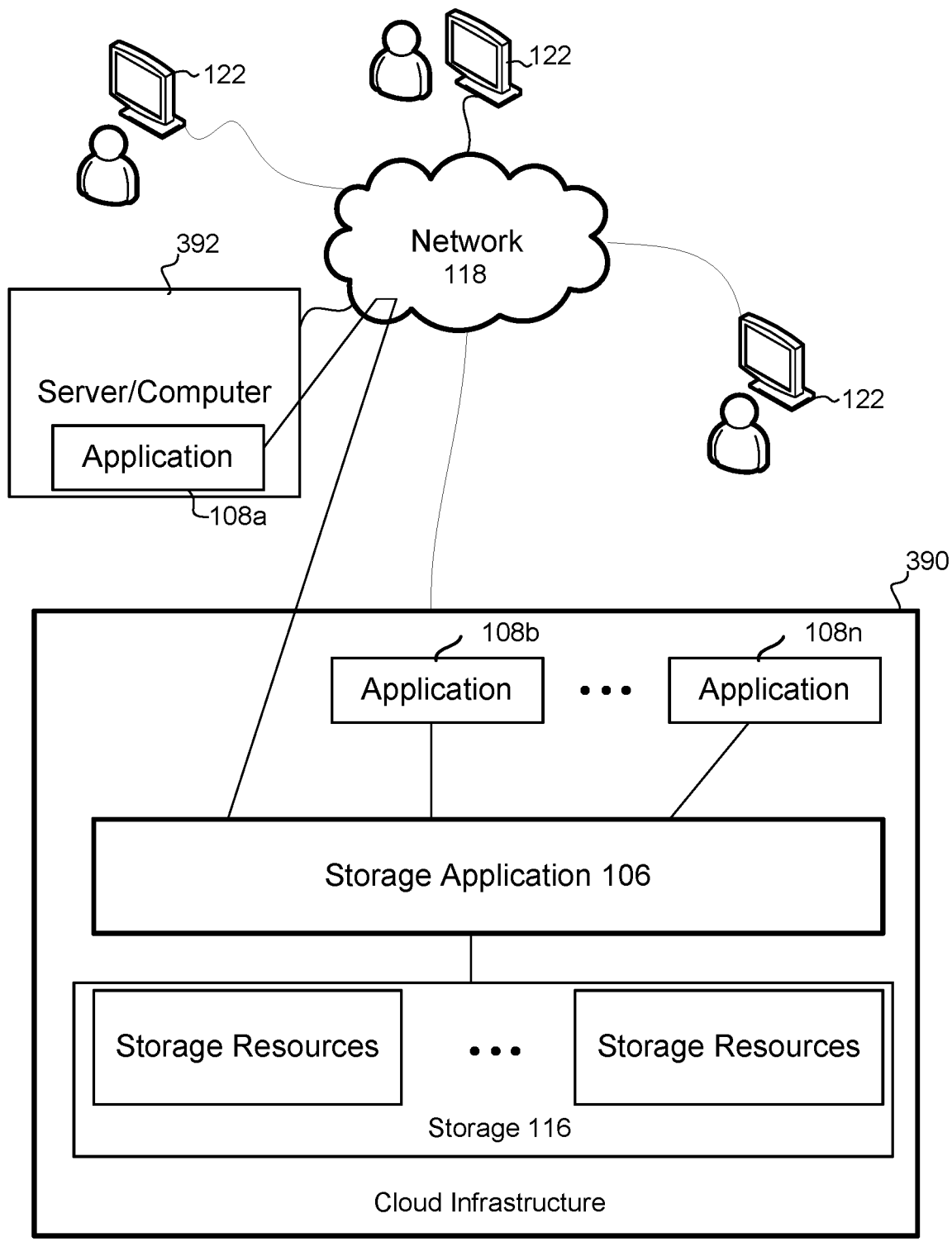
FIG. 9B illustrates an embodiment where storage application is executed on the cloud infrastructure, but one or more of the applications utilizing storage application can be executed outside of the cloud infrastructure.

FIG. 9B illustrates an embodiment where storage application 106 is executed on the cloud infrastructure 390, but one or more of the applications utilizing storage application 106 can be executed outside of the cloud infrastructure 390. As shown, a server or computer 392 may be connected to the network 118, and can be provided for executing application 108a. In one embodiment, the programming interface, connection, or login credential is provided for application 108a, which directs its storage access commands through storage application 106. For example, storage application 106 can be providing storage access operations to other applications, such as applications 108b-108n. However, another application or multiple other applications, such as application 108a, can be executed outside of the cloud infrastructure, yet still is provided with access to the storage application 106 for facilitating access to storage 116.

For more information regarding storage systems, functions, features, operations, scale-out configurations, all flash arrays, hybrid arrays, and/or system components, reference may be made to U.S. patent application Ser. No. 14/748,179, filed on Jun. 23, 2015, which claims priority to U.S. Provisional Patent Application No. 62/058,015, filed on Sep. 30, 2014. Each of these applications is incorporated herein by references for all purposes.

It should be apparent, that the present embodiments may be practiced without some or all of these specific details. Modification to the modules, code and communication interfaces are also possible, so long as the defined functionality for the storage array or modules of the storage array is maintained. In other instances, well-known process operations have not been described in detail in order not to unnecessarily obscure the present embodiments.

One or more embodiments can also be fabricated as computer readable code on a non-transitory computer readable storage medium. The non-transitory computer readable storage medium is any non-transitory data storage device that can store data, which can thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments and sample appended claims.

What is claimed is:

1. A method for storage processing on a cloud system, comprising:
executing a storage application on a compute node of the cloud system, the storage application configured to process write commands and read commands for data in a storage of the cloud system, the write commands and the read commands being from an application;
processing, by the storage application, a write command from the application, the processing comprising:
writing a complete set of data blocks for the write command to a memory cache, in the compute node, for the storage application;
writing the complete set of data blocks written to the memory cache to a write cache of a block storage that is part of the storage of the cloud system;
identifying select data blocks within the complete set of data blocks, the select data blocks identified based on a determination that the select data blocks are likely to be accessed more frequently than other blocks of the complete set of data blocks;
writing the select data blocks written to the memory cache to a read cache of the block storage; and
coalescing the data blocks in the memory cache to produce data segments; and
writing, by the storage application, the data segments to an object storage that is part of the storage of the cloud system.

2. The method of claim 1, further comprising,
applying, by the storage application, data reduction to the data blocks in the memory cache to produce reduced data blocks, wherein the coalescing is of the reduced data blocks.

3. The method of claim 2, wherein the data reduction comprises compressing or deduplicating the data blocks in the memory cache.

4. The method of claim 2, wherein the writing of the select data blocks to the read cache of the block storage occurs after applying the data reduction to produce the reduced data blocks, the select data blocks written to the read cache comprising select reduced data blocks of the reduced data blocks.

5. The method of claim 1, further comprising,
processing, by the storage application, a read command from the application, the processing of the read command comprising:
reading responsive data blocks for the read command from the memory cache if the responsive data blocks are in the memory cache;
if the responsive data blocks are not in the memory cache, reading the responsive data blocks from the read cache of the block storage; and
if the responsive data blocks are not in the memory cache and not in the read cache of the block storage, reading the responsive data blocks from the object storage.

6. The method of claim 5, further comprising,
writing, by the storage application, the responsive data blocks read from the object storage to the read cache of the block storage.

7. The method of claim 1, wherein each of the write cache and the read cache are defined by one or more volumes that are logically associated to the block storage.

8. The method of claim 7, wherein the one or more volumes of the read cache have a performance level that is greater than the one or more volumes of the write cache.

9. The method of claim 2, wherein the coalescing of the reduced data blocks arranges the reduced data blocks in sequential order to produce the data segments.

10. The method of claim 9, wherein the data segments each has a size of a megabyte or larger, the size of each of the data segments acting to optimize writing to the object storage.

11. The method of claim 1, wherein the block storage is accessible by random input/output (I/O) storage operations.

12. The method of claim 1, wherein the processing by the storage application utilizes the block storage and the object storage in a hybrid-cloud storage configuration that provides for acknowledgments of write commands via the memory cache.

13. The method of claim 1, wherein the storage application executes a storage operating system logic that directs writing to and reading to and from the storage that includes the block storage and the object storage.

14. The method of claim 1, further comprising receiving, by the storage application, access from a plurality of applications, the storage application providing an interface for the plurality of applications to access the storage of the cloud system.

15. The method of claim 1, wherein the storage application is a storage processing layer between the application and the storage of the cloud system, the storage application configured to direct processing of data blocks exchanged between the application and the storage, the cloud system being provisioned by an online cloud service provider.

16. A cloud system, comprising,
a compute node comprising a memory cache;
a storage application executable in the compute node to process write commands and read commands for data in a storage of the cloud system, the write commands and the read commands being from an application,
the storage application executable in the compute node to:
process a write command from the application by:
writing a complete set of data blocks for the write command to the memory cache,
writing the complete set of data blocks written to the memory cache to a write cache of a block storage that is part of the storage of the cloud system,
identifying select data blocks within the complete set of data blocks, the select data blocks identified based on a determination that the select data blocks are likely to be accessed more frequently than other blocks of the complete set of data blocks,
writing the select data blocks written to the memory cache to a read cache of the block storage, and
coalescing the data blocks in the memory cache to produce data segments;
write the data segments to an object storage that is part of the storage of the cloud system; and
process a read command from the application by:
reading responsive data blocks for the read command from the memory cache if the responsive data blocks are in the memory cache,
if the responsive data blocks are not present in the memory cache, reading the responsive data blocks from the read cache,
if the responsive data blocks are not present in the memory cache and the read cache, reading the responsive data blocks from the object storage.

17. The cloud system of claim 16, wherein the block storage is accessible using random input/output (I/O) operations, and wherein the data segments each has a size of a megabyte or larger.

18. A non-transitory computer readable medium comprising instructions that upon execution cause a cloud system to:
execute a storage application on a compute node of the cloud system, the storage application configured to process write commands and read commands for data of a storage of the cloud system, the write commands and the read commands being from an application;
process, by the storage application, a write command from the application, the processing comprising:
writing a complete set of data blocks for the write command to a memory cache, in the compute node, for the storage application;
writing the complete set of data blocks written to the memory cache to a write cache of a block storage that is part of the storage of the cloud system;
identifying select data blocks within the complete set of data blocks, the select data blocks identified based on a determination that the select data blocks are likely to be accessed more frequently than other blocks of the complete set of data blocks; and
writing the select data blocks written to the memory cache to a read cache of the block storage;
apply data reduction to the data blocks in the memory cache to produce reduced data blocks;
coalesce the reduced data blocks to form data segments; and
write, by the storage application, the data segments to object storage that is part of the storage of the cloud system.

19. The cloud system of claim 16, wherein the storage application is executable in the compute node to:
apply data reduction to the data blocks in the memory cache to form reduced data blocks,
wherein the coalescing is of the reduced data blocks to form the data segments.

20. The cloud system of claim 19, wherein the select data blocks written to the read cache comprise select reduced data blocks of the reduced data blocks.

* * * * *